United States Patent
Zangi et al.

(10) Patent No.: US 8,107,983 B2
(45) Date of Patent: Jan. 31, 2012

(54) SYSTEMS AND METHOD FOR COORDINATED MULTIPOINT DOWNLINK TRANSMISSIONS

(75) Inventors: Kambiz Zangi, Chapel Hill, NC (US); Dennis Hui, Cary, NC (US); Leonid Krasny, Cary, NC (US)

(73) Assignee: Telefonaktiebolaget L M Ericsson, Stockholm (SE)

( * ) Notice: Subject to any disclaimer, the term of this patent is extended or adjusted under 35 U.S.C. 154(b) by 460 days.

(21) Appl. No.: 12/404,773

(22) Filed: Mar. 16, 2009

(65) Prior Publication Data

US 2010/0234053 A1    Sep. 16, 2010

(51) Int. Cl.
*H04B 15/00* (2006.01)
*H04B 7/02* (2006.01)
(52) U.S. Cl. .................. 455/501; 455/63.1; 375/267

(58) Field of Classification Search .................. 455/501, 455/63.1, 67.13; 375/267, 299, 347
See application file for complete search history.

(56) References Cited

U.S. PATENT DOCUMENTS

2005/0213682 A1 *   9/2005   Han et al. .................. 375/267

OTHER PUBLICATIONS

Chae, et al. Coordinated Beamforming for the Multiuser MIMO Broadcast Channel with Limited Feedforward. IEEE Transactions on Signal Processing, IEE Service Center, New York, NY, US. vol. 55 No. 12 Dec. 1, 2008. pp. 6044-6056: XP011233956.

* cited by examiner

*Primary Examiner* — Daniel D Chang

(57) ABSTRACT

A method for determining antenna weights for use in transmitting data from a plurality of base stations to a user device is disclosed. The antenna weights are determined using an input covariance matrix (S), and the input covariance matrix is determined subject to a predetermined power constraint and a predetermined, non-zero interference constraint.

20 Claims, 7 Drawing Sheets

SYSTEMS AND METHOD FOR COORDINATED MULTIPOINT DOWNLINK TRANSMISSIONS

TECHNICAL FIELD

The present invention relates to cellular communication systems. More specifically, in some aspects, the present invention relates to coordinated cellular communication systems.

BACKGROUND

In a non-coordinated, conventional cellular communication system, the transmissions to different users are formed independently. Hence, the transmission to one user typically acts as unwanted interference to other users. Because the system forms the transmission to each user independently, the system has no way of knowing how a transmission to a particular user will impact other users in the vicinity. As a result, with small to medium-sized cells and orthogonal multiple access within one cell, other-cell interference is a main factor limiting the performance of evolved cellular systems. Particularly for users near the cell edge, the other-cell interference is a main factor prohibiting the delivery of high data rate to these users.

In a non-coordinated multiple-input multiple output (MIMO) transmission with channel state information (CSI) available at the transmitter, where the transmitted signal for user $u_0$ is formed independently of what interference this transmitted signal generates at other users, the output vector y received by the desired user $u_0$ is given by Equation (1) below $$y = Hx + n, \qquad (1)$$

where x is a vector of size $t \times 1$ that represents the total signal transmitted from all the transmitted antennas, H is a fixed channel response matrix for user $u_0$ whose size is $r \times t$ (the channel matrix for the desired user is fixed and is perfectly known at the transmitter and by the desired user $u_0$), and n is a Gaussian, circularly symmetric, complex-valued random noise vector with zero mean and covariance $N_0 I$.

Let $$S = E[xx^\dagger] \qquad (2)$$

represent the transmit covariance matrix, and under the total average power constraint at the transmitter, we require that $$tr(S) \leq P_0. \qquad (3)$$

The maximum data rate that can be reliably transmitted over the channel H is referred to as the capacity of the MIMO channel H. This capacity is obtained by maximizing the mutual information between x and y over all possible choices of S:

$$\text{minimize } \Phi(S) = -\log\det\left(I + \frac{1}{N_0} HSH^\dagger\right) \qquad (4)$$

$$\text{subject to } S \geq 0 \qquad (5)$$

$$tr(S) \leq P_0 \qquad (6)$$

Viewed as an optimization problem over the set of positive semidefinite matrices of size $t \times t$, denoted by $S_+^t$, the problem in Equation (4) is convex; since, the objective function $\Phi(S)$ is a convex function of S, and the constraint (6) is linear in S.

The Lagrangian associated with the optimization problem equation (4) is:

$$L(S, l_1, Y) = -\log\det\left(I + \frac{1}{N_0} HSH^\dagger\right) + l_1(tr(S) - P_0) - tr(YS) \qquad (7)$$

where $\lambda_1$ is the Lagrangian multiplier associated with the constraint equation (5), and $\Psi$ is the Lagrangian multiplier matrix associated with the constraint equation (3). Given that the problem is convex, and assuming that a strictly feasible S exists, the following KKT conditions are necessary and sufficient for optimality:

$$\frac{\partial L}{\partial S} = -\frac{1}{N_0} H^\dagger \left(I + \frac{1}{N_0} HSH^\dagger\right)^{-1} H + \lambda_1 I - \Psi = 0 \qquad (8)$$

$$tr(\Psi S) = 0 \qquad (9)$$

$$\lambda_1(tr(S) - P_0) = 0 \qquad (10)$$

$$\lambda_1, \Psi \geq 0 \qquad (11)$$

By direct substitution, it can be easily verified that the well-known waterfilling solution for S satisfies the KKT conditions of equation (8):

$$H = U \Lambda V^\dagger \qquad (12)$$

$$\Lambda = \text{diag}(\mu_1, \mu_2, \ldots, \mu_r, 0, \ldots, 0) \qquad (13)$$

$$S = V \text{diag}(P_1, P_2, \ldots P_r, 0, \ldots 0) V^\dagger \qquad (14)$$

$$P_i = \left(\frac{1}{\lambda 1} - \frac{N_0}{\mu_i^2}\right)_+ \qquad (15)$$

$$\sum_{i=1}^{r} \left(\frac{1}{\lambda 1} - \frac{N_0}{\mu_i^2}\right)_+ = P_0 \qquad (16)$$

It is important to note that the solution for S obtained in equations (12-16) result in $tr(S) = P_0$ and $\lambda_1 > 0$, i.e. the obtained S satisfies the following specific version of the KKT conditions:

$$-\frac{1}{N_0} H^\dagger \left(I + \frac{1}{N_0} HSH^\dagger\right)^{-1} H + \lambda_1 I - \Psi = 0 \qquad (17)$$

$$tr(\Psi S) = 0 \qquad (18)$$

$$tr(S) - P_0 = 0 \qquad (19)$$

$$\lambda_1 > 0 \qquad (20)$$

$$\Psi \geq 0 \qquad (21)$$

A coordinated cellular communication system with distributed antennas uses it knowledge of the propagation environment to control the mutual interference by jointly shaping the signals that are transmitted to all the users. Coordinated transmission methods on the downlink must fundamentally adjust the transmission to each user so that two competing goals are satisfied: (1) a transmission to a user should be configured such that the signal corresponding to the transmission that is received at the antenna(s) of the user is strong and (2) the signal corresponding to the transmission that is received by the antennas of all other users should be weak.

Zero-Forcing Coordinated Transmission

With zero-forcing transmission, the transmission to each user generates absolutely no interference to any other active user in the coordinated multipoint (CoMP) cell, while the total power transmitted to each user must be below a pre-specified limit $P_0$. See e.g., G. Caire and S. Shamai, "On the achievable throughput in multiantenna Gaussian broadcast channel," *IEEE Trans. Infor. Theory*, vol. 49, July 2003.

Problem with Existing Technology

A problem with non-coordinated transmission is that it ignores completely the fact that in a wireless environment, the transmission to one user acts as interference to all other users. A problem with zero-forcing, coordinated transmission is that it breaks down at high system loads. COMP methods on the downlink must fundamentally adjust the transmission to each user so that two competing goals are satisfied: (1) the signal received by the antennas of user $u_0$ must be strong, (2) the signal received by the antennas of all other users must be weak. By making the interference zero, the zero-forcing method fundamentally puts too much emphasis on the second goal, at the expense of ignoring the first goal. At high loads, there are a large number of antennas that the transmitted signal for user $u_0$ must be projected away from; hence, the transmitted signal is restricted to a very small sub-space. In this case, it is quite likely that transmitting in this very restricted sub-space will result in a small received signal power at the desired user $u_0$. This effect is similar to the well-known "noise-enhancement" problem associated with a zero-forcing receiver.

SUMMARY

As discussed above, coordinated transmission methods on the downlink must fundamentally adjust the transmission to each user so that two competing goals are satisfied: (1) the signal received by the antennas of user $u_0$ must be strong, (2) the signal received by the antennas of all other users must be weak. In embodiments of the present invention, our approach is to make the interference to other users small but non-zero. More specifically, we determine the transmission scheme that maximizes the data rate that can be reliably transmitted to user $u_0$ subject to two constraints: (1) the total power transmitted to user $u_0$ must be kept below $P_0$, and (2) the sum of the interference generated by the signal transmitted for user $u_0$ at all other users must be kept below $P_I$.

The formulation presented in this disclosure can be considered a generalization of the zero-forcing transmission technique, where the total interference generated by the signal transmitted for user $u_0$ at all other users is zero.

Thus, in one aspect the present invention provides a method for transmitting data from a plurality of base stations to a user device. In some embodiments, the method includes the steps of: (1) determining antenna weights for each of the plurality of base stations that maximize the data rate that can be reliably transmitted to the user device subject to a predetermined power constraint and a predetermined, non-zero interference constraint; and (2) transmitting data to the user device using the determined antenna weights.

In some embodiments, the step of determining the antenna weights includes the following steps: (1) for the user device and each of a plurality of other user devices in communication with the plurality of base stations, determining a channel response matrix (H); (2) for the user device and each the plurality of other user devices, generating an interference constraint matrix (G); (3) using H and G for the user device, determining an input covariance matrix (S) for the user device subject to the predetermined power constraint and the predetermined, non-zero interference constraint; (4) using S, determining antenna weights for each of the plurality of base stations.

In some embodiments, the step of determining S subject to the power constraint and the interference constraint comprises: (1) selecting a variable ($\alpha$); and (2) using $\alpha$ to compute S. In some embodiments, the step of selecting $\alpha$ comprises: (a) setting $\alpha$ to an initial value; (b) after step (a), using $\alpha$ to determine a transmit power; (c) after step (b), determining whether the determined transmit power is equal or about equal to predetermined power constraint value ($P_0$); and (d) after step (c), increasing or decreasing $\alpha$ and repeating steps (b) through (d) if the determined transmit power is not equal or about equal to $P_0$. The step of using $\alpha$ to determine the transmit power may includes computing equations (72)-(77) and (81), which are defined below.

In some embodiments, the step of determining S further comprises: (a) determining S subject only to the predetermined power constraint; (b) after step (a), evaluating interference generated for the plurality of other user devices; (c) based on the evaluated interference, determining whether the predetermined interference constraint is satisfied. In some embodiments, steps (a)-(c) are performed prior to the step of determining S subject to the predetermined power constraint and the predetermined interference constraint. In some embodiments, step (a) comprises computing equations (12) through (16), which are defined below.

In some embodiments, the step of determining S further comprises: (d) determining whether an interference constraint matrix has a full rank in response to determining in step (c) that the predetermined interference constraint is not satisfied. In some embodiments, the step of determining S subject to the predetermined power constraint and the predetermined interference constraint is performed in response to determining in step (d) that the interference constraint matrix does not have a full rank.

In some embodiments, the step of determining S further comprises: (e) computing S subject only to the predetermined interference constraint; and (f) after step (e), determining whether the power constraint is satisfied. In some embodiments, the step of determining S subject to the predetermined power constraint and the predetermined interference constraint is performed in response to determining in step (f) that the power constraint is not satisfied.

In another aspect, the present invention provides a controller for determining antenna weights for use in transmitting data to a user device via a plurality of base stations in communication with the controller. In some embodiments, the controller includes: a transmitter and receiver for communicating with the plurality of base stations; a data storage system; and a data processing system. The data processing system is configured to: (1) determine antenna weights for each of the plurality of base stations that maximize the data rate that can be reliably transmitted to the user device subject to a predetermined power constraint and a predetermined, non-zero interference constraint; and (2) cause the data to be transmitted to the user device using the determined antenna weights.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

DETAILED DESCRIPTION

Figure 1:
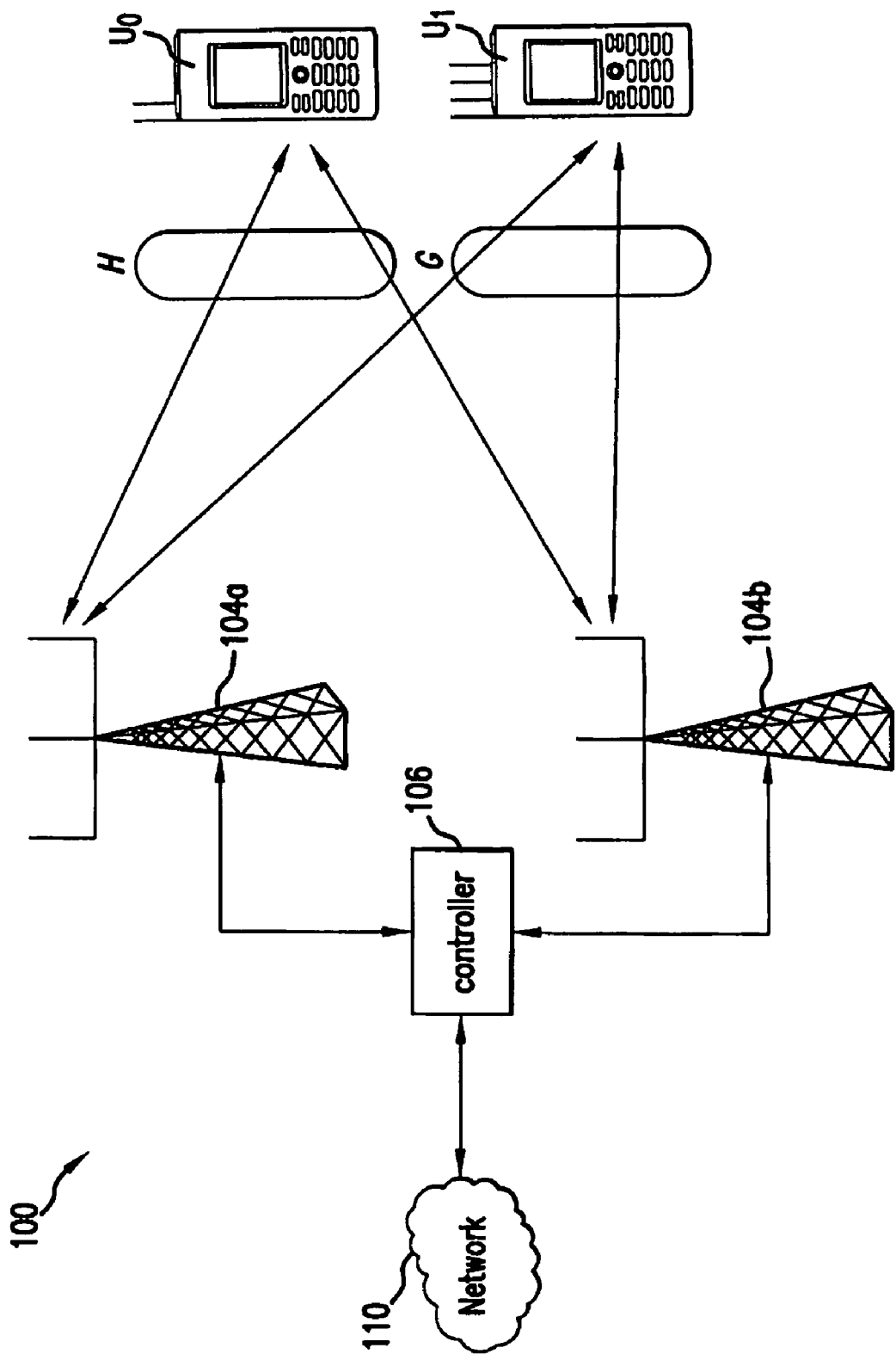
FIG. 1 illustrates a system according to an embodiment of the invention.

Referring now to FIG. 1, FIG. 1 illustrates a MIMO cellular communication system 100 according to an embodiment of the invention. As shown in FIG. 1, two users ($u_0$ and $u_1$) each receive a signal x transmitted from base stations 104 (e.g., base stations 104a and 104b), and the received signal due to x acts as unwanted interference for user $u_1$ (in the example $u_0$ has two antennas and $u_1$ has four antennas, but one skilled in the art will appreciate that user devices can have any number of antennas and there could be more than one user device to whom signal x acts as unwanted interference. One skilled in the art will understand that the present invention also applies to the case where there are multiple users to whom signal x acts as unwanted interference. It is natural to ask what is the maximum data rate that can be reliably transmitted to user $u_0$ subject to the constraint that the interference power received by user $u_1$ (here u1 represents all of the other users) must remain below a pre-specified value $P_I$.

Assuming that G represents the MIMO channel to user $u_1$, the received interference at user $u_1$ due to transmission of x to $u_0$ is:

$$y_I = Gx \qquad (22)$$

The received interference power at user $u_1$ due to transmission of x to user $u_0$ is then:

$$I = E\{tr(y_I y_I^\dagger)\} \qquad (23)$$
$$= E\{tr((Gx)(Gx)^\dagger)\} \qquad (24)$$
$$= tr(E\{G^\dagger G\}S) \qquad (25)$$

where in going from equation (24) to (25), we have used the assumption that the transmitted signal x is independent of the channel G. More formally, the capacity of the MIMO channel with an interference power constraint can be expressed as the solution to the following optimization problem:

$$\text{minimize } \Phi(S) = -\text{logdet}\left(I + \frac{1}{N_0}HSH^\dagger\right) \qquad (26)$$

$$\text{subject to } S \geq 0 \qquad (27)$$

$$tr(S) \leq P_0 \qquad (28)$$

$$tr(QS) \leq P_I \qquad (29)$$

where we assume that Q in equation (29) belongs to $S_+^t$ (e.g. $Q = E\{G^\dagger G\}$). The above optimization problem is again convex over $S \in S_+^t$; since, the objective function is convex, and both constraints are linear in S.

In equation (26), we have used $N_0$ for the noise seen by the desired user $u_0$, which is valid if the transmitter to user $u_1$ is different from the transmitter to user $u_0$. If the same transmitter is used to transmit to both users, one should also consider the impact of the transmission to user $u_1$ on user $u_0$. Assuming that transmission to user $u_1$ is formed such that the interference power received by user $u_0$ is also below $P_I$, one could approximate this impact by replacing $N_0$ in equation (26) by ($N_0 + P_I$). Since, $P_I$ is just a known constant, this replacement will not change the formulation of the problem at all. For simplicity of exposition, we will continue to use $N_0$ in equation (26).

Following the same steps as before, the Lagrangian for the optimization problem in equation (26) can be expressed as:

$$L(S, \lambda_1, \lambda_2, \Psi) = \qquad (30)$$
$$-\text{logdet}\left(I + \frac{1}{N_0}HSH^\dagger\right) + \lambda_1(tr(S) - P_0) + \lambda_2(tr(QS) - P_I) - tr(\Psi S),$$

and the corresponding KKT conditions for the interference constrained problems are:

$$\frac{\partial L}{\partial S} = -\frac{1}{N_0}H^\dagger\left(I + \frac{1}{N_0}HSH^\dagger\right)^{-1}H + \lambda_1 I + \lambda_2 Q - \Psi = 0 \qquad (31)$$

$$tr(\Psi S) = 0 \qquad (32)$$

$$\lambda_1(tr(S) - P_0) = 0 \qquad (33)$$

$$\lambda_2(tr(QS) - P_I) = 0 \qquad (34)$$

$$\lambda_1, \lambda_2 \geq 0 \qquad (35)$$

$$\Psi \geq 0 \qquad (36)$$

Again, we will assume that a strictly feasible S exists; hence, the KKT conditions corresponding to equation (31-36) are sufficient and necessary for optimality. The solution to the optimization problem equation (26) is then the unique solution to the KKT equations (31-36).

Focusing on the KKT conditions (equation (33), equation (34), and equation (35)), there are four distinct ways in which these three equations can be simultaneously satisfied:

$$(tr(S) < P_0; l_1 = 0) \text{ and } (tr(QS) < P_I; l_2 = 0) \qquad (1)$$

$$(tr(S) = P_0; l_1 > 0) \text{ and } (tr(QS) < P_I; l_2 = 0) \qquad (2)$$

$$(tr(S) < P_0; l_1 = 0) \text{ and } (tr(QS) = P_I; l_2 > 0) \qquad (3)$$

$$(tr(S) = P_0; l_1 > 0) \text{ and } (tr(QS) = P_I; l_2 > 0) \qquad (4)$$

In the following four subsections, we will treat each of the above cases separately. To avoid getting a degenerate solution for S, we will make the additional assumption that the optimal S results in an objective function that is strictly greater than zero. This is a rather mild assumption that essentially says the problem should have a non-trivial (i.e. non-zero) solution.

Case 1

We show by contradiction that the optimal solution can not belong to case 1. Assume that $S_\star$ is the optimal solution, and assume that it satisfies the conditions of case 1. Assuming that the problem has a non-trivial solution resulting in non-zero objective function, we can show that $\Phi(\beta S_\star)$ is a monotonically decreasing function of $\beta \geq 0$. This implies that one could always decrease the objective function by replacing $S_\star$ with $\beta S_\star$ as long as $\beta$ is strictly larger than 1; however by continuity, for $\beta$ sufficiently close to 1 (but still strictly larger than 1), $tr(\beta S) < P_0$ and $tr(Q\beta S) < P_1$. Hence, we have arrived at a contradiction; since, $S$ is supposed to be the unique optimal solution of the optimization problem.

Case 2

In this case, the KKT conditions for the interference problem become identical to the KKT condition for the MIMO channel subject only to a transmit power constraint. Hence, the optimal $S$ in this case can be obtained from equations (12)-(15).

Case 3

In this case, the KKT conditions reduce to the following:

$$\frac{\partial L}{\partial S} = -\frac{1}{N_0} H^\dagger \left( I + \frac{1}{N_0} H S H^\dagger \right)^{-1} H + \lambda_2 Q - \Psi = 0 \quad (37)$$

$$tr(\Psi S) = 0 \quad (38)$$

$$tr(QS) - P_1 = 0 \quad (39)$$

$$\lambda_2 > 0 \quad (40)$$

$$\Psi \geq 0 \quad (41)$$

We will treat the case where $Q$ is full rank (i.e. invertible) separately, from the case where $Q$ is rank deficient.

Case 3 with a Full-rank Q

With a full-rank $Q$, we define the square root of $Q$ as:

$$Q = WW^\dagger. \quad (42)$$

It is important to note that in this case, $W$ is also a full-rank matrix. Next, let us change to the following equivalent variables:

$$\tilde{H} = HW^{-\dagger} \quad (43)$$

$$\tilde{S} = W^\dagger S W \quad (44)$$

$$\tilde{\Psi} = W^{-1} \Psi W^{-\dagger} \quad (45)$$

The KKT conditions for Case 3 (37-41) can be expressed in terms of the new variables in equation (43-45) as:

$$-\frac{1}{N_0} \tilde{H}^\dagger \left( I + \frac{1}{N_0} \tilde{H} \tilde{S} \tilde{H}^\dagger \right)^{-1} \tilde{H} + \lambda_2 I - \tilde{\Psi} = 0 \quad (46)$$

$$tr(\tilde{\Psi} \tilde{S}) = 0 \quad (47)$$

$$tr(\tilde{S}) - P_1 = 0 \quad (48)$$

$$\lambda_2 > 0 \quad (49)$$

$$\tilde{\Psi} \geq 0 \quad (50)$$

In terms of the changed variables, the KKT equations (46-50) have the exactly the same form as the KKT equations (17-21) that we encountered in obtaining the capacity of the MIMO channel subject only to a transmit power constraint. Hence, the solution to equation (46-50) can be obtained by the standard waterfilling based on the SVD of $\tilde{H}$, let this solution be called $\tilde{S}_\star$. Given $\tilde{S}_\star$, the optimal $S$ can be obtained according to:

$$S_\star = W^{-\dagger} \tilde{S}_\star W^{-1} \quad (51)$$

Case 3 with Rank Deficient Q

If $Q$ is rank deficient, $Q$ can be expressed as $$Q = [V_1 \; V_0] \begin{bmatrix} \Lambda & 0 \\ 0 & 0 \end{bmatrix} \begin{bmatrix} V_1^\dagger \\ V_0^\dagger \end{bmatrix} \quad (52)$$

where $[V_1 V_0]$ is a unitary matrix. Note that this unitary property implies that $V_1 V_0^\dagger = 0$. Using this decomposition it is easy to show that this case can not happen.

Case 4

The KKT conditions in this case can be expressed as:

$$-\frac{1}{N_0} H^\dagger \left( I + \frac{1}{N_0} H S H^\dagger \right)^{-1} H + \lambda_2 \left( Q + \frac{\lambda_1}{\lambda_2} I \right) - \Psi = 0 \quad (53)$$

$$tr(\Psi S) = 0 \quad (54)$$

$$tr(S) - P_0 = 0 \quad (55)$$

$$tr(QS) - P_1 = 0 \quad (56)$$

$$\lambda_1, \lambda_2 > 0 \quad (57)$$

$$\Psi \geq 0 \quad (58)$$

The following change of variables will be helpful in solving the above KKT conditions for $S$:

$$\alpha = \frac{\lambda_1}{\lambda_2} \quad (59)$$

$$\tilde{Q}(\alpha) = (Q + \alpha I) \quad (60)$$

$$\tilde{W}(\alpha) \tilde{W}^\dagger(\alpha) = \tilde{Q}(\alpha) \quad (61)$$

$$\tilde{S}(\alpha) = \tilde{W}^\dagger S \tilde{W} \quad (62)$$

$$\tilde{H}(\alpha) = H \tilde{W}^{-\dagger}(\alpha) \quad (63)$$

$$\tilde{\Psi}(\alpha) = \tilde{W}^{-1} \Psi \tilde{W}^{-\dagger} \quad (64)$$

It is important to note that equation (57) implies that $\alpha$ is always strictly greater than zero in case 4, and this in turn implies that $\tilde{Q}(\alpha)$ is always full rank, and $\tilde{W}(\alpha)$ is always full rank in case 4.

The KKT conditions equation (53-58) can be expressed equivalently in terms of the new variables defined in equation (59-64) as:

$$-\frac{1}{N_0} \tilde{H}^\dagger(\alpha) \left( I + \frac{1}{N_0} \tilde{H}(\alpha) \tilde{S} \tilde{H}^\dagger(\alpha) \right)^{-1} \tilde{H}(\alpha) + \lambda_2 I - \tilde{\Psi} = 0 \quad (65)$$

$$tr(\tilde{\Psi} \tilde{S}) = 0 \quad (66)$$

$$tr(\tilde{S}) - \alpha P_0 - P_1 = 0 \quad (67)$$

$$\lambda_2 > 0 \quad (68)$$

$$\tilde{\Psi} \geq 0 \quad (69)$$

$$tr(\tilde{W}^{-\dagger}(\alpha) \tilde{S} \tilde{W}^{-1}(\alpha)) - P_0 = 0 \quad (70)$$

$$\alpha > 0 \quad (71)$$

For any given α>0, equations (65-69) are identical in form to the equations (17-21) that we encountered in finding the capacity of the standard MIMO channel subject only to a transmit power constraint. Hence, for any given α>0, the standard waterfilling approach based on the SVD of $\tilde{H}(\alpha)$ can be used to solve for $\tilde{S}$ as a function of α:

$$\tilde{W}(\alpha)\tilde{W}^\dagger(\alpha) = (Q + \alpha I) \quad (72)$$

$$\tilde{H} = U(\alpha)\Lambda(\alpha)V^\dagger(\alpha) \quad (73)$$

$$\Lambda(\alpha) = \text{diag}(\mu_1(\alpha), \mu_2(\alpha), \ldots, \mu_r(\alpha), 0, \ldots, 0) \quad (74)$$

$$P_i(\alpha) = \left(\frac{1}{\lambda^2} - \frac{N_0}{\mu_i^2(\alpha)}\right)_+ \quad (75)$$

$$\sum_{i=1}^{r}\left(\frac{1}{\lambda^2} - \frac{N_0}{\mu_i^2(\alpha)}\right)_+ = \alpha P_0 + P_I \quad (76)$$

$$\tilde{S}(\alpha) = V \text{diag}(P_1(\alpha), P_2(\alpha), \ldots, P_r(\alpha), 0, \ldots, 0) V^\dagger \quad (77)$$

Finally, to determine the optimal value of α, we substitute $\tilde{S}(\alpha)$ from equation (77) in the 6-th KKT condition (i.e. in equation (70)) thus obtaining:

$$tr(\tilde{W}^{-\dagger}(\alpha)\tilde{S}(\alpha)\tilde{W}^{-1}(\alpha)) = P_0 \quad (78)$$

The only unknown in equation (78) is α; hence, this equation can be numerically solved to obtain the optimal value of α.

A slightly more convenient form of equation (78) can be obtained based on the SVD of the matrix Q. To this end, let $Q = V_Q \Lambda_Q V_Q^\dagger$, where $V_Q$ is a unitary matrix and $\Lambda_Q$ is a diagonal matrix. One can then express $\tilde{W}(\alpha)$ as:

$$\tilde{W}(\alpha) = V_Q(\Lambda_Q + \alpha I)^{1/2} \quad (79)$$

$$\tilde{W}^{-1}(\alpha) = (V_Q + \alpha I)^{-1/2} V_Q^\dagger. \quad (80)$$

Substituting equation (79-80) in equation (78) and rearranging terms, we get:

$$tr((\Lambda_Q + \alpha I)^{-1}\tilde{S}(\alpha)) = P_0 \quad (81)$$

Numerically, computing the left-hand side of equation (81) requires only inverting a diagonal matrix, while computing the left-hand side of equation (78) requires inverting a full matrix $\tilde{W}(\alpha)$.

In summary, equation (81) is a single equation in terms of the scalar variable α that must be solved numerically to determine the optimal value of α. Once the optimal α is determined, equation (72-77) can be used to determine the optimal value of $\tilde{S}$ and $\tilde{W}$. Finally, the optimal value of the input covariance matrix S can be obtained according to:

$$S = \tilde{W}^{-\dagger}\tilde{S}\tilde{W}^{-1}. \quad (82)$$

Numerical Results

We compare the system-level performance of a system with COMP Transmission on the downlink with two transmission techniques: (1) Zero-forcing beamforming and (2) the herein described Epsilon-forcing beamforming.

With zero-forcing beamforming, the transmission to each user generates absolutely no interference to any other active user in the CoMP cell. With epsilon-forcing beamforming the transmission to each user is generated in such a way that the average interference generated at all other active user is below some ε. In either method, the total power transmitted to each user must be below a pre-specified limit.

Figure 7:
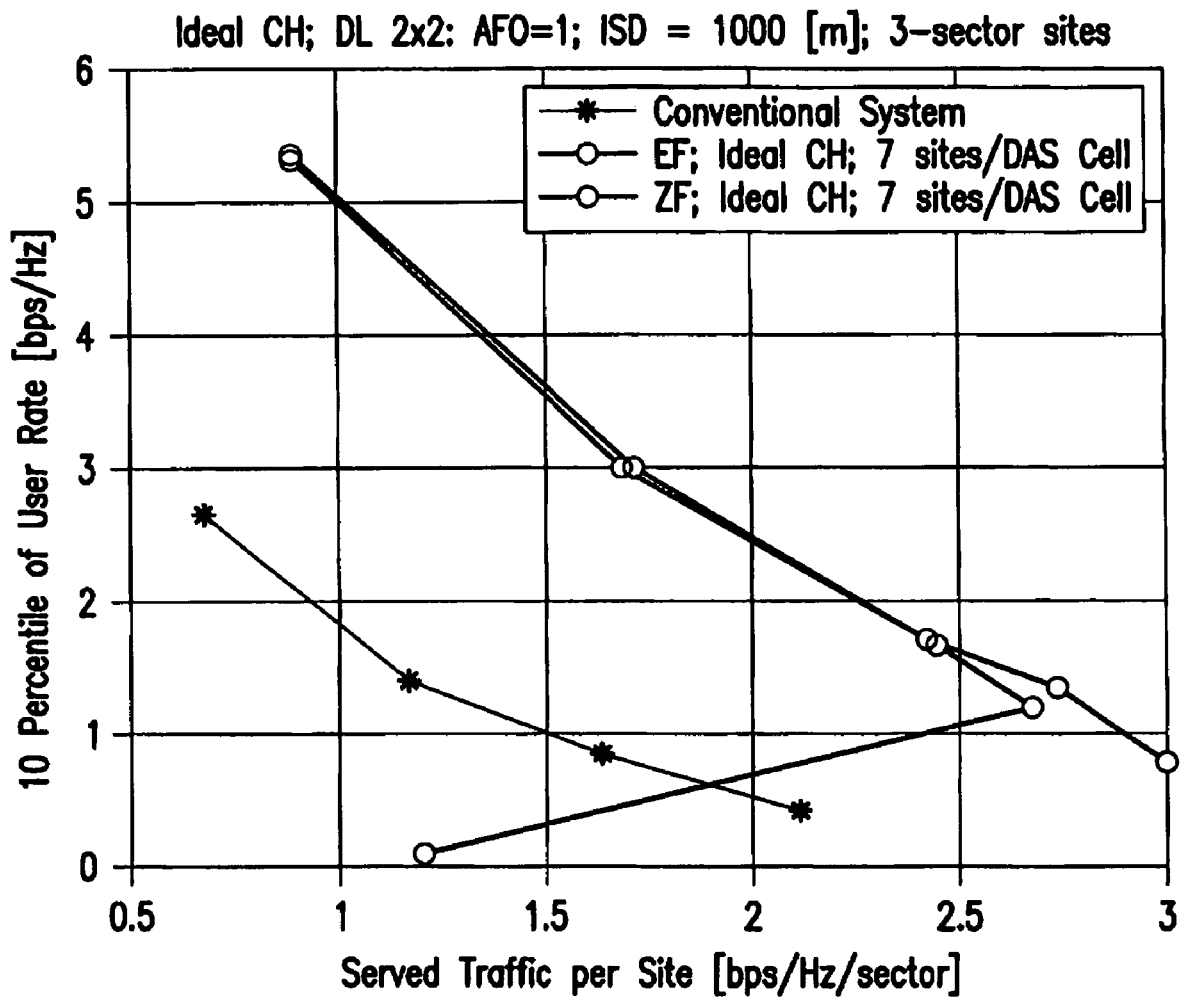
FIG. 7 is a plot illustrating an advantage of an embodiment of the present invention.

Referring now to FIG. 7, FIG. 7 is a plot of the 10 percentile user bitrate versus the system throughput for both methods. From this figure, we see that at low to moderate system loads, the two methods performs very similarly. However, at high system loads, the epsilon-forcing method (labeled "EF" in the plot) significantly out performs the zero-forcing (labeled "ZF" in the plot) method.

Referring back to FIG. 1, as shown in FIG. 1, system 100 includes a controller 106 in communication with base stations 104a and 104b. Only two base stations and two users are shown for simplicity. One of ordinary skill in the art will appreciate that system 100 may include more than two base stations and more than two users. Controller 106 is configured to determine the optimal value of S, as described above, and then use this value to compute antenna weights for use in transmitting data to users $u_0$ and $u_1$.

Figure 2:
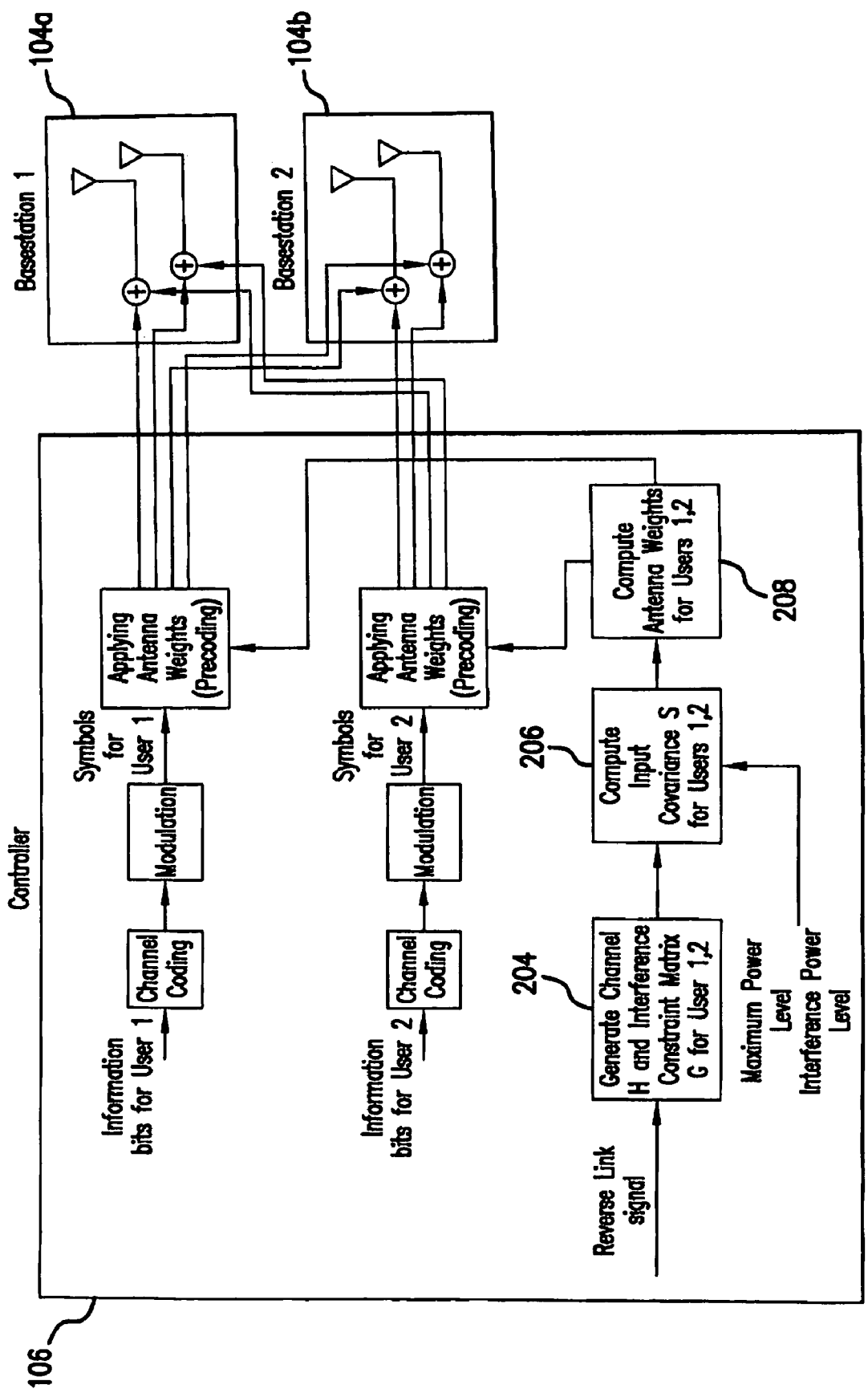
FIG. 2 is a functional block diagram of a controller according to some embodiments of the invention.

Referring now to FIG. 2, FIG. 2 illustrates a functional block diagram of controller 106. As shown in FIG. 2, controller 106, may include a matrix computing module 204 that computes, for each of users $u_0$ and $u_1$, a channel response matrix H and an interference constraint matrix G based on received reverse link signals (i.e., data transmitted to controller 106 from a base station 104). For example, a base station 104 may receive a pilot signal from a user and, based on the pilot, estimate the channel between the base station and the use. This channel estimate may then be sent to controller 106, which may be configured to use the channel estimate to compute H and G.

Controller 106 may further include (1) an input covariance matrix computing module 206 for computing, for each of users $u_0$ and $u_1$, an input covariance matrix S, and (2) an antenna weight computing module 208 for computing, for each of users $u_0$ and $u_1$, antenna weights for each cooperating base station 104. The antenna weights are then used to transmit data to users $u_0$ and $u_1$.

Figure 3:
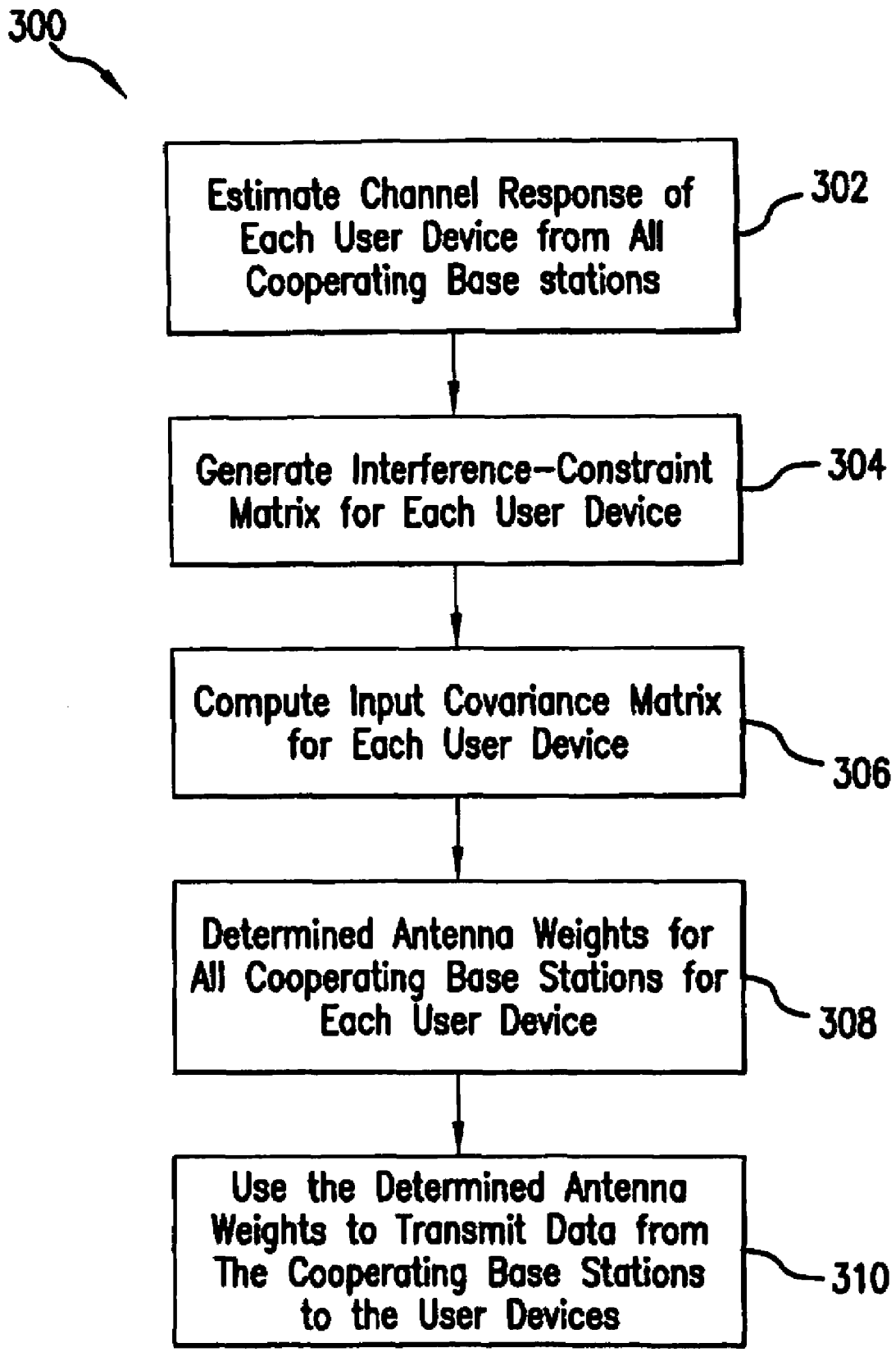
FIG. 3 is a flow chart illustrating a process according to some embodiments of the invention.

Referring now to FIG. 3, FIG. 3 is a flow chart illustrating a process 300, according to some embodiments, that is performed by controller 106 for determining antenna weights for use in transmitting data from a plurality of cooperating base stations (e.g. base stations 104a and 104b) to a user device (e.g., user $u_0$). Process 300 may begin in step 302, where controller 106 determines a channel response matrix (H) for user $u_0$ and each of a plurality of other users (e.g., user $u_1$) in communication with base stations 104. Next (step 304), controller 106 generates an interference constraint matrix (G) for user $u_0$ and each of other users. Next (step 306), controller 106 determines an input covariance matrix S for user $u_0$ using the H and G for the user. Next (step 308), controller 106 determines antenna weights for each of the plurality of base stations using the S determined in step 306. Finally (step 310), the determined antenna weights are used to transmit data to user $u_0$. Advantageously, the S (and hence beam forming weights) determined in step 306 maximizes the data rate that can be reliably transmitted to the user device subject to a predetermined power constraint (see e.g., Equation (28)) and a predetermined, non-zero interference constraint(see e.g., Equation (29)).

Figure 4:
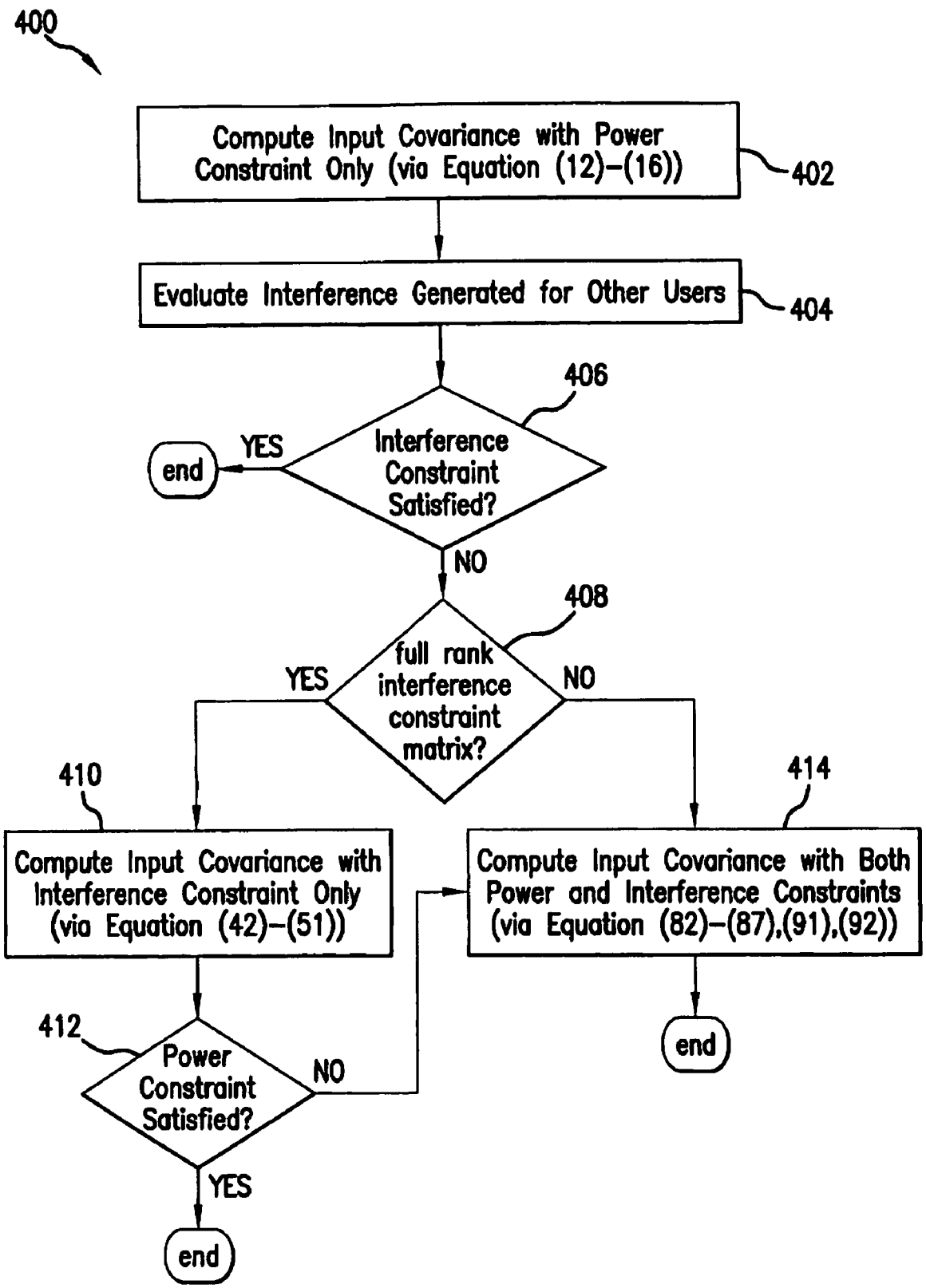
FIG. 4 is a flow chart illustrating a process according to some embodiments of the invention.

Referring now to FIG. 4, FIG. 4 is a flow chart illustrating a process 400, according to some embodiments, for determining S for user $u_0$ (i.e., performing step 306). Process 400 may begin in step 402, where controller 106 computes S subject only to a power constraint. For example, in step 402, controller 106 computes S using equations (12)-(16). In step 404, controller 106 uses S computed in step 402 to determines the interference generated for other users. For example, in step 404, controller 106 generates an inference constraint matrix. In step 406, determines whether an interference constraint is satisfied. For example, controller 106 determines whether the interference determined in step 404 falls within an acceptable range. If the interference constraint is satisfied, process 400 may end, otherwise process 400 may proceed to step 408. In step 408, controller 106 determines whether the interference constraint matrix has a full rank. If it does have a full rank, process 400 proceeds to step 410, otherwise process 400 proceeds to step 414.

In step 410, controller 106 computes S subject only to an interference constraint. For example, in step 410, controller 106 computes S using equations (42)-(51). In step 412, controller 106 determines a transmit power and determines whether a power constraint is satisfied. For example, in step 412, controller determines whether the determined transmit power falls within an acceptable power range. If the power constraint is satisfied, then process 400 may end, otherwise process 400 proceeds to step 414.

In step 414, controller 106 computes S subject to the interference constraint and the power constraint. For example, in step 410, controller 106 computes S using equations (72)-(77), (81) and (82).

Figure 5:
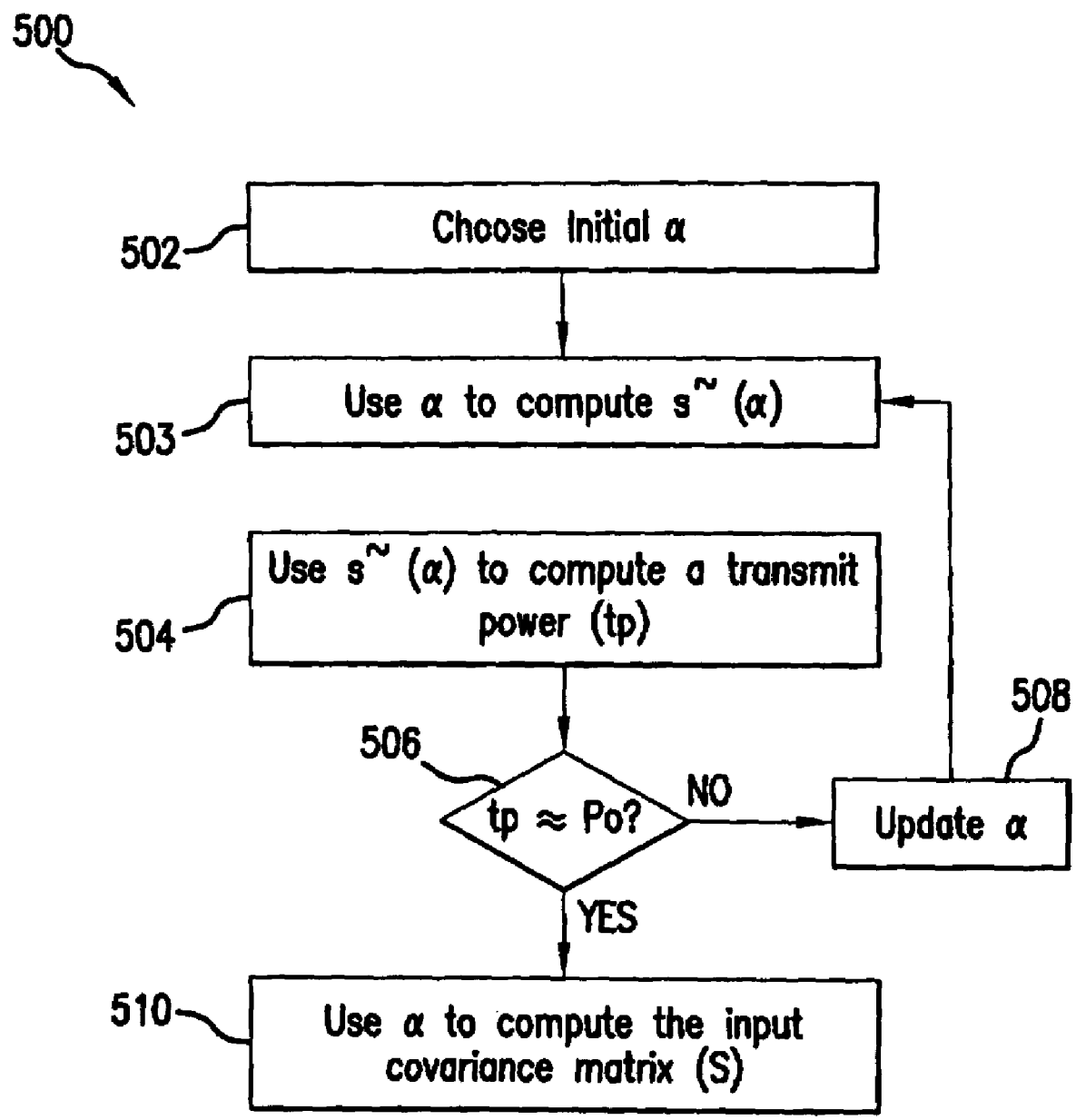
FIG. 5 is a flow chart illustrating a process according to some embodiments of the invention.

Referring now to FIG. 5, FIG. 5 is a flow chart illustrating a process 500, according to some embodiments, for performing step 414. Process 500 may begin in step 502 where a variable $\alpha$ is set to an initial value. In step 503, controller 106 uses $\alpha$ to determine $\tilde{S}(\alpha)$. For example, in step 503, controller may use $\alpha$ and equations (72)-(77) to calculate $\tilde{S}(\alpha)$. In step 504, controller 106 uses $\tilde{S}(\alpha)$ to determine a transmit power (Tp). For example, in step 504, controller may use $\tilde{S}(\alpha)$ and equation (81) to calculate Tp. In step 506, controller 106 determines whether the determined transmit power (Tp) is equal or about equal to a predetermined power constraint value ($P_0$). If Tp is equal or about equal to $P_0$, then process 500 proceeds to step 510, otherwise it proceeds to step 508. In step 508, controller 106 updates $\alpha$ (e.g., controller 106 either increase or decreases $\alpha$). After step 508, process 500 returns to step 503. In step 510, controller 106 uses $\alpha$ to compute S. For example, in step 510, controller uses $\alpha$ and equations (72)-(77) to determine optimal values of $\tilde{S}$ and $\tilde{W}$. Finally, the optimal value of the input covariance matrix S can be obtained according to equation (82).

Figure 6:
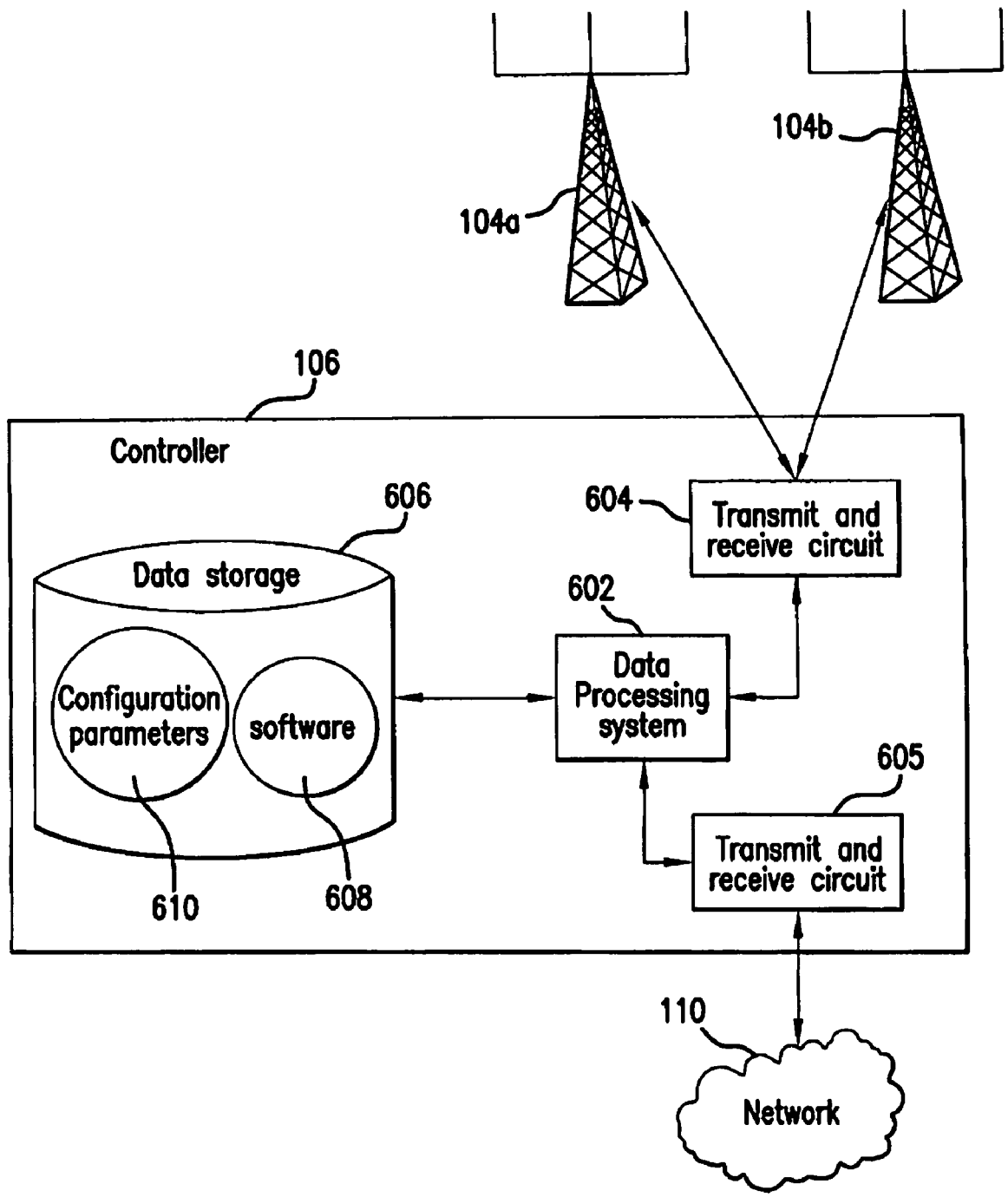
FIG. 6 is a functional block diagram of a controller according to some embodiments of the invention.

Referring now to FIG. 6, FIG. 6 is a functional block diagram of controller 106 according to some embodiments of the invention. As shown, controller 106 may comprise a data processing system 602 (e.g., one or more microprocessors), a data storage system 606 (e.g., one or more non-volatile storage devices) and computer software 608 stored on the storage system 606. Configuration parameters 610 (e.g., the above mentioned power an interference constraint values) may also be stored in storage system 606. Controller 106 also includes transmit/receive (Tx/Rx) circuitry 604 for transmitting data to and receiving data from base stations 104 and transmit/receive (Tx/Rx) circuitry 605 for transmitting data to and receiving data from, for example, core network 110. Software 608 is configured such that when processor 602 executes software 608, controller 106 performs steps described above (e.g., steps described above with reference to the flow charts). For example, software 608 may include: (1) a matrix computing module (e.g. computer instructions) that compute, channel response matrixes H and interference constraint matrixes G based on received reverse link signals; (2) an input covariance matrix computing module (e.g, computer instructions) for computing input covariance matrixes S as described above; and (3) an antenna weight computing module (e.g., computer instructions) for computing antenna weights based using the computed input covariance matrixes S.

Advantages of the invention include: (1) improving the cell-edge bitrate while at the same time increasing system capacity; (2) a simple linear implementation technique compared to the implementation of non-linear coordinated transmission schemes (e.g. dirty-paper coding); and (3) outperforming non-coordinated systems at all system loads, unlike the well-known zero-forcing transmission scheme that breaks down at high system loads.

While various embodiments of the present invention have been described above, it should be understood that they have been presented by way of example only, and not limitation. Thus, the breadth and scope of the present invention should not be limited by any of the above-described exemplary embodiments.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for transmitting data from a plurality of base stations to a user device, comprising steps of:
    determining antenna weights for each of the plurality of base stations that maximize the data rate that can be reliably transmitted to the user device subject to a predetermined power constraint and a predetermined, non-zero interference constraint, wherein steps of determining the antenna weights comprises:
    for the user device and each of a plurality of other user devices in communication with the plurality of base stations, determining a channel response matrix (H);
    for the user device and each the plurality of other user devices, generating an interference constraint matrix (G);
    using H and G for the user device, determining an input covariance matrix (S) for the user device subject to the power constraint and the interference constraint; and
    using S to determine the antenna weights; and
    transmitting data to the user device using the determined antenna weights.

2. The method of claim 1, wherein the step of determining S subject to the power constraint and the interference constraint comprises:
    selecting a variable ($\alpha$); and
    using $\alpha$ to compute S, wherein
    the step of selecting $\alpha$ comprises:
    (a) setting $\alpha$ to an initial value;
    (b) after step (a), using $\alpha$ to determine a transmit power;
    (c) after step (b), determining whether the determined transmit power is equal or about equal to predetermined power constraint value ($P_0$); and
    (d) after step (c), increasing or decreasing $\alpha$ and repeating steps (b) through (d) if the determined transmit power is not equal or about equal to $P_0$.

3. The method of claim 2, wherein the step of using $\alpha$ to determine a transmit power comprises computing equation $\text{tr}((\Lambda_Q + \alpha I)^{-1} \tilde{S}(\alpha)) = P_0$.

4. The method of claim 3, wherein the step of using $\alpha$ to determine a transmit power further comprises computing equations $$\tilde{W}(\alpha)\tilde{W}^{554}(\alpha) = (Q + \alpha I),$$

$$\tilde{H} = U(\alpha)\Lambda(\alpha)V^\dagger(\alpha),$$

$$\Lambda(\alpha) = \text{diag}(\mu_1(\alpha), \mu_2(\alpha), \ldots, \mu_r(\alpha), 0, \ldots, 0),$$

$$P_i(\alpha) = \left(\frac{1}{\lambda^2} - \frac{N_0}{\mu_i^2(\alpha)}\right)_+, \sum_{i=1}^{r}\left(\frac{1}{\lambda^2} - \frac{N_0}{\mu_i^2(\alpha)}\right)_+ = \alpha P_0 + P_1,$$

and $$\tilde{S}(\alpha) = V \operatorname{diag}(P_1(\alpha), P_2(\alpha), \ldots, P_r(\alpha), 0, \ldots, 0) V^\dagger$$

prior to computing equation $\operatorname{tr}((\Lambda_Q + \alpha I)^{-1}\tilde{S}(\alpha)) = P_0$.

5. The method of claim 1, wherein the step of determining S comprises:
(a) determining S subject only to the predetermined power constraint;
(b) after step (a), evaluating interference generated for the plurality of other user devices;
(c) based on the evaluated interference, determining whether the predetermined interference constraint is satisfied, wherein steps (a)-(c) are performed prior to the step of determining S subject to the predetermined power constraint and the predetermined interference constraint.

6. The method of claim 5, wherein step (a) comprises computing equations $$H = U\Lambda V^\dagger,$$

$$\Lambda = \operatorname{diag}(\mu_1, \mu_2, \ldots \mu_r, 0, \ldots, 0),$$

$$S = V \operatorname{diag}(P_1, P_2, \ldots, P_r, 0, \ldots, 0) V^\dagger,$$

$$P_i = \left(\frac{1}{\lambda^1} - \frac{N_0}{\mu_i^2}\right)_+, \text{ and } \sum_{i=1}^{r}\left(\frac{1}{\lambda^1} - \frac{N_0}{\mu_i^2}\right)_+ = P_0.$$

7. The method of claim 5, wherein the step of determining S further comprises:
(d) determining whether an interference constraint matrix has a full rank in response to determining in step (c) that the predetermined interference constraint is not satisfied.

8. The method of claim 7, wherein the step of determining S subject to the predetermined power constraint and the predetermined interference constraint is performed in response to determining in step (d) that the interference constraint matrix does not have a full rank.

9. The method of claim 7, wherein the step of determining S further comprises:
(e) computing S subject only to the predetermined interference constraint; and
(f) after step (e), determining whether the power constraint is satisfied.

10. The method of claim 9, wherein the step of determining S subject to the predetermined power constraint and the predetermined interference constraint is performed in response to determining in step (f) that the power constraint is not satisfied.

11. A controller for determining antenna weights for use in transmitting data to a user device via a plurality of base stations in communication with the controller, comprising:
a transmitter and receiver for communicating with the plurality of base stations;
a data storage system; and
a data processing system, wherein the data processing system is configured to:

determine antenna weights for each of the plurality of base stations that maximize the data rate that can be reliably transmitted to the user device subject to a predetermined power constraint and a predetermined, non-zero interference constraint, wherein the data processing system is configured to determine the antenna weights by steps of:
determining a channel response matrix (H) for the user device and each of a plurality of other user devices in communication with the plurality of base stations;
generating an interference constraint matrix (G) for the user device and each the plurality of other user devices;
determining an input covariance matrix (S) subject to the predetermined power constraint and the predetermined, non-zero interference constraint for the user device using H and G for the user device; and
using S to determine the antenna weights; and
cause the data to be transmitted to the user device using the determined antenna weights.

12. The controller of claim 11, wherein the data processing system is configured to determine S subject to the power constraint and the interference constraint by:
selecting a variable ($\alpha$); and
using $\alpha$ to compute S, wherein
selecting $\alpha$ comprises:
(a) setting $\alpha$ to an initial value;
(b) after step (a), using $\alpha$ to determine a transmit power;
(c) after step (b), determining whether the determined transmit power is equal or about equal to predetermined power constraint value ($P_0$); and
(d) after step (c), increasing or decreasing $\alpha$ and repeating steps (b) through (d) if the determined transmit power is not equal or about equal to $P_0$.

13. The controller of claim 12, wherein the data processing system is configured to use $\alpha$ to determine a transmit power by computing equation $\operatorname{tr}((\Lambda_Q + \alpha I)^{-1}\tilde{S}(\alpha)) = P_0$.

14. The controller of claim 13, wherein the data processing system is configured to use $\alpha$ to determine a transmit power by computing equations $$\tilde{W}(\alpha)\tilde{W}^\dagger(\alpha) = (Q + \alpha I),$$

$$\tilde{H} = U(\alpha)\Lambda(\alpha)V^\dagger(\alpha),$$

$$\Lambda(\alpha) = \operatorname{diag}(\mu_1(\alpha), \mu_2(\alpha), \ldots, \mu_r(\alpha), 0, \ldots, 0),$$

$$P_i(\alpha) = \left(\frac{1}{\lambda^2} - \frac{N_0}{\mu_i^2(\alpha)}\right)_+, \sum_{i=1}^{r}\left(\frac{1}{\lambda^2} - \frac{N_0}{\mu_i^2(\alpha)}\right)_+ = \alpha P_0 + P_1,$$

and $$\tilde{S}(\alpha) = V \operatorname{diag}(P_1(\alpha), P_2(\alpha), \ldots, P_r(\alpha), 0, \ldots, 0) V^\dagger$$

prior to computing equation $\operatorname{tr}((\Lambda_Q + \alpha I)^{-1}\tilde{S}(\alpha)) = P_0$.

15. The controller of claim 11, wherein the data processing system is configured to determine S by steps of:
(a) determining S subject only to the predetermined power constraint;
(b) after (a), evaluating interference generated for the plurality of other user devices;
(c) based on the evaluated interference, determining whether the predetermined interference constraint is satisfied, wherein the data processing system is configured to perform steps (a)-(c) prior to determining S subject to the predetermined power constraint and the predetermined interference constraint.

16. The controller of claim 15, wherein the data processing system is configured to perform step (a) by computing equations $$H = U \Lambda V^\dagger,$$

$$\Lambda = \text{diag}(\mu_1, \mu_2, \ldots \mu_r, 0, \ldots, 0),$$

$$S = V \text{diag}(P_1, P_2, \ldots, P_r, 0, \ldots, 0) V^\dagger,$$

$$P_i = \left(\frac{1}{\lambda^1} - \frac{N_0}{\mu_i^2}\right)_+, \text{ and } \sum_{i=1}^{r} \left(\frac{1}{\lambda^1} - \frac{N_0}{\mu_i^2}\right)_+ = P_0.$$

17. The controller of claim 15, wherein the data processing system is configured to determine S by:

(d) determining whether an interference constraint matrix has a full rank in response to determining in step (c) that the predetermined interference constraint is not satisfied.

18. The controller of claim 17, wherein the data processing system is configured to determine S subject to the predetermined power constraint and the predetermined interference constraint in response to determining that the interference constraint matrix does not have a full rank.

19. The controller of claim 17, wherein the data processing system is configured to determine S by further:

(e) computing S subject only to the predetermined interference constraint; and (f) after (e), determining whether the power constraint is satisfied.

20. The controller of claim 19, wherein the data processing system is configured to determine S subject to the predetermined power constraint and the predetermined interference constraint in response to determining that the power constraint is not satisfied.

* * * * *

UNITED STATES PATENT AND TRADEMARK OFFICE
CERTIFICATE OF CORRECTION

PATENT NO. : 8,107,983 B2
APPLICATION NO. : 12/404773
DATED : January 31, 2012
INVENTOR(S) : Zangi et al.

It is certified that error appears in the above-identified patent and that said Letters Patent is hereby corrected as shown below:

On the Face Page, in Field (73), under "Assignee", in Column 1, Line 1,
delete "Ericsson," and insert -- Ericsson (PUBL), --, therefor.

On the Face Page, in Field (56), under "OTHER PUBLICATIONS", in Column 2,
Line 1, delete "Muliuser" and insert -- Multiuser --, therefor.

In Column 2, Line 33, in Equation (14), delete " $\ldots P_r, 0, \ldots, 0) V^\dagger$ " and insert -- $\ldots, P_r, 0, \ldots, 0) V^\dagger$ --, therefor.

In Column 3, Line 17, delete "COMP" and insert -- CoMP --, therefor.

In Column 5, Line 38, delete "u1" and insert -- $u_1$ --, therefor.

In Column 6, Line 57, in Equation (4), delete " $= P_l; I_2 > 0)$ " and insert -- $= P_l; I_2 > 0).$ --, therefor.

In Column 9, Line 58, delete "COMP" and insert -- CoMP --, therefor.

In Column 10, Line 66, delete "inference" and insert -- interference --, therefor.

In Column 11, Line 38, delete "a to" and insert -- α to --, therefor.

Signed and Sealed this
Seventeenth Day of April, 2012

David J. Kappos
*Director of the United States Patent and Trademark Office*

CERTIFICATE OF CORRECTION (continued)
U.S. Pat. No. 8,107,983 B2

In Column 12, Line 63, in Claim 4, delete "$\tilde{W}(\alpha)\tilde{W}^{\wedge 54}(\alpha)=(Q+\alpha I),$" and insert -- $\hat{W}(\alpha)\hat{W}^{\dagger}(\alpha)=(Q+\alpha I),$ --, therefor.

In Column 13, Line 28, in Claim 6, delete "$\ldots \mu_r, 0, \ldots, 0),$" and insert -- $\ldots, \mu_r, 0, \ldots, 0),$ --, therefor.

In Column 15, Line 10, in Claim 16, delete "$\ldots \mu_r, 0, \ldots, 0),$" and insert -- $\ldots, \mu_r, 0, \ldots, 0),$ --, therefor.